United States Patent [19]

Wada et al.

[11] Patent Number: 4,636,420

[45] Date of Patent: Jan. 13, 1987

[54] GROOVED MAGNETIC SUBSTRATES AND METHOD FOR PRODUCING THE SAME

[75] Inventors: Toshiaki Wada, Takatsuki; Junichi Nakaoka, Amagasaki; Takayuki Sugano, Osaka, all of Japan

[73] Assignee: Sumitomo Special Metals Co., Ltd., Osaka, Japan

[21] Appl. No.: 607,137

[22] Filed: May 4, 1984

[30] Foreign Application Priority Data

May 4, 1983 [JP] Japan .................................. 58-78676

[51] Int. Cl.$^4$ .............................................. G11B 5/42
[52] U.S. Cl. ..................................... 428/156; 29/603; 65/36; 427/129; 428/163; 428/336; 428/312.6; 428/317.3; 428/318.4; 428/432; 428/433; 428/694; 428/900
[58] Field of Search .............................. 360/120, 121; 252/62.62; 428/694, 900, 432, 433, 312.6, 317.3, 318.4, 156, 163, 336; 427/129, 130, 128, 8; 29/603; 65/36

[56] References Cited

U.S. PATENT DOCUMENTS

| | | | |
|---|---|---|---|
| 3,375,575 | 4/1968 | Visser | 360/120 |
| 3,605,258 | 9/1971 | Fisher | 360/120 |
| 3,795,954 | 3/1974 | Alex | 360/120 |
| 4,048,714 | 9/1977 | Huntt | 360/120 |
| 4,182,643 | 1/1980 | Calderon | 428/900 |
| 4,188,247 | 2/1980 | Ridgeway | 428/900 |
| 4,238,215 | 12/1980 | Yokoyama | 65/36 |
| 4,316,228 | 2/1982 | Fujiwara | 360/120 |
| 4,351,104 | 9/1982 | Klagune | 29/603 |

Primary Examiner—Ellis P. Robinson
Attorney, Agent, or Firm—Burns, Doane, Swecker & Mathis

[57] ABSTRACT

A grooved magnetic substrate for thin film magnetic heads having grooves filled with glass having substantially no pores therein and an interdiffusion layer between substrate and glass of 5 microns or less. The substrate is produced by hot-filling the groove with glass at a viscosity of $10^6$–$10^8$ poise and subjecting the substrate to hot isostatic pressure at $10^6$ poise or higher to define a definite apex point to define the gap depth.

10 Claims, 3 Drawing Figures

GROOVED MAGNETIC SUBSTRATES AND METHOD FOR PRODUCING THE SAME

FIELD OF THE INVENTION

The present invention relates to magnetic substrates having a grooved structure which is useful for thin film magnetic heads and a method for the production thereof. More particularly, the present invention relates to grooved magnetic substrates wherein the pores in the glass which is charged in the groove of the substrate are steeply decreased in number and an interdiffusion layer between the magnetic substrate and the glass is reduced or limited in thickness and to a process for the production thereof.

BACKGROUND

Recently, thin film magnetic heads are being put to practical use, and are known to have properties higher than, by one order of magnitude or more, those of the conventional magnetic heads prepared by using soft ferrite blocks as the starting plates. In order to improve the properties of such thin film magnetic heads, it is also proposed to form a stepped structure in the cross-section of the thin magnetic films thereof.

However, since the thin film heads of the stepped structure are of a low strength with respect to the sliding movement of magnetic recording media, provision has been made of thin film magnetic heads using magnetic substrates having therein a groove filled with a non-magnetic layer, whereby the distance between the opposite poles is magnetically increased, and the substrate is physically (geometrically) of a flush surface. In general, glass is used as the non-magnetic layer.

The currently available substrates used for that purpose are ones of a diameter of 76.0 mm (maximum) × a thickness of no more than 4 mm and ones with a square side of no more than 50.8 mm × a thickness of 1-2 mm. In the near future, however, use may possibly be made of substrates of larger dimensions. For example, the dimensions of the grooves are of a width of 10-100 microns × a depth of 10-50 microns for the consumer or personal purpose, and of a width of 0.1-0.5 mm × a depth of 10-100 microns for use in computers.

In order to embed glass into the surface of the magnetic substrates such as Mn-Zn ferrite, Ni-Zn ferrite or the like in the groove form, there is a process wherein plate-like glass is placed in at least one groove formed in the surface of the magnetic substrate, and heated to a temperature at which a glass viscosity reaches $10^4$–$10^5$ poise, thereby to form a non-magnetic layer. However, such procedures pose problems in that pores easily appear in the formed glass layer, and, when Mn-Zn ferrite is used as the magnetic substrate, an interdiffusion layer of the substrate and glass components is formed in a region where they come into contact with each other.

In the preparation of thin film magnetic heads, a glass layer is formed on a substrate, and, thereafter, several kinds of thin films defining a magnetic circuit are formed on the precision finished glass layer with the use of IC technology. However, if pores are produced in such a glass layer, disconnection or poor insulation of the magnetic circuit, and/or a variation in magnetic properties will be obtained due to the exposed pores. Additionally, the yield of the head product will also be dependent largely upon the number of pores, thus posing a grave problem in view of quality control.

SUMMARY OF THE DISCLOSURE

An apex point defining the boundary between the substrate of the groove portion and the glass layer therein in the magnetic circuit of the thin film head provides a reference point upon determining the gap depth of the thin film head. The input and output of the head are largely affected by this gap depth. However, there is a variation in the location of apex point according to the thickness of the interdiffusion layer formed in the contact boundary between the groove portion of the substrate and the glass layer. Such variation leads to a problem that it fluctuates the gap depth with the resulting variation in electromagnetic properties.

With a view to obtaining a grooved magnetic substrate which further improves the electromagnetic properties of a thin film head and in the extreme reduces a variation in the products, it is an object of the present invention to provide a magnetic substrate having therein a groove filled with a glass layer while preventing formation of pores, in which the formation of an interdiffusion layer between the glass and the substrate components is reduced in the extreme, and a method for producing the same.

That is to say, the present invention provides a grooved magnetic substrate for thin film magnetic heads, which has therein at least one groove filled with glass, wherein:

the number of pores with a size of 1 micron or larger in the filled glass is no more than one (1)/mm$^3$ (on an average), and an interdiffusion layer between said substrate and said glass has a thickness of no more than 5 microns.

Although depending upon the size of said substrate and the spacing between the adjacent grooves, the number of the grooves to be formed therein ranges from one (1) to a hundred (100).

Furthermore, the present invention provides a process for the production of grooved magnetic substrates, which comprises hot-filling under a load at least one groove formed in a surface of a magnetic substrate with glass heated to a temperature at which said glass has a glass viscosity of $10^6$–$10^8$ poise and, thereafter, subjecting said magnetic substrate to hot isostatic pressing at or below a temperature at which the glass viscosity of said glass is $10^6$ poise.

1 . . . magnetic substrate,
2 . . . groove,
3 . . . glass layer,
4 . . . conductive layer,
5 . . . magnetic layer,
6 . . . low-melting point glass layer,
7 . . . non-magnetic coating,
8 . . . gap portion,
9 . . . apex point, 10 ... insulating layer.

PREFERRED EMBODIMENTS OF THE DISCLOSURE

In the grooved magnetic substrate for thin film magnetic heads, the reason for limiting the number of pores having a size of no less than 1 micron to no more than one (1)/mm$^3$ (on an average) is that the presence of the pores exceeding that figure in the glass layer causes them to be exposed to the glass surface, when the substrate is precision finished on the surface so as to form a magnetic circuit on the glass surface. Such exposure of pores is responsible for disconnection of the magnetic circuit or variations in magnetic properties, and thus give rise to a grave problem in the quality control of the products, and incurs a lowering of the yield of the products.

In the grooed magnetic substrats for thin film magnetic heads, the reason why the interdiffusion layer between the magnetic substrate and the glass is limited to no more than 5 microns in thickness is that, if the thickness of that layer exceeds 5 microns, there are variations in the apex point position due to the thickness of the interdiffusion layer formed in the contact boundary between the groove portion of the substrate and the glass layer, so that there is a fluctuation in the gap depth leading to variations in electromagnetic properties.

Figure 1:
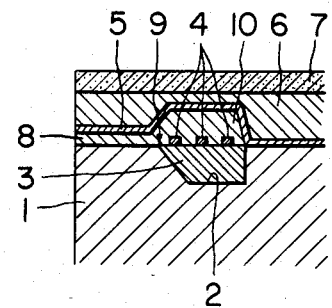
FIG. 1 is a view illustrating a section of a thin film magnetic head.

Referring to the process for producing the grooved magnetic substrates according to the present invention, a groove 2 is formed in a magnetic substrate 1 by mechanical processing, photoetching or the like, as shown in the sectional view of a thin film magnetic head of FIG. 1. The groove 2 is filled under pressure with glass heated to a temperature at which said glass has a glass viscosity of $10^6$–$10^8$ poise to form a glass layer 3. Thereafter, the magnetic substrate 1 is subjected to hot isostatic pressing at or below a temperature at which the glass viscosity of said glass is $10^6$ poise to provide the magnetic substrate according to the present invention.

With the resultant grooved magnetic substrate according to the present invention, no pores are present in the glass layer filled in the groove, and the thickness of the interdiffusion layer between the glass and the substrate components is reduced.

Subsequently, the magnetic substrate 1 is precisely plane finished on the surface, and a conductive layer 4, an insulating layer 10, a magnetic layer 5, a low-melting glass layer 6 and a non-magnetic coating 7 are formed onto the glass layer 3 and the magnetic substrate 1 by suitable thin film-forming methods such as sputtering, vapor deposition or the like to form a thin film pattern resulting in a thin film magnetic head. It is to be noted that reference numerals 8 and 9 stand for a gap portion and an apex point, respectively.

In the process for the production of the grooved magnetic substrates according to the present invention, the temperature at which the glass is filled in the groove is such that a glass viscosity ranges from $10^6$ to $10^8$ poise, since a temperature at which the filled glass has a glass viscosity of less than $10^6$ poise is so high that the interdiffusion between the glass layer components and the magnetic substrate components so proceeds as to form a thicker interdiffused layer, while, at a temperature at which the glass viscosity exceeds $10^6$ poise, insufficient filling and adhesion of the glass in and to the groove are obtained so that they separate easily from each other.

The pressure at which the glass is filled in the groove may properly be chosen depending upon the nature of the substrate material, the type of glass, the size of grooves, the temperature used and other factors. That pressure is preferably no less than about 0.1 kg/mm$^2$, and may be applied through weight loading or pressing device.

The preferred conditions for the hot isostatic pressing are given below. That is, preferred is a pressing temperature at or below which the viscosity of said glass is $10^6$ poise, since the interdiffusion reaction between the glass layer components and the magnetic substrate components becomes so vigorous that the thickness of the resulting interdiffusion layer exceeds 5 microns at a temperature at which the glass viscosity of the filled layer exceeds $10^6$ poise. More specifically, it is required that the glass viscosity be fixed at $10^6$ to $10^8$ poise at the pressing temperature, since a temperature at which it is higher than $10^8$ poise has less effect upon the elimination of pores from the glass layer. A preferred pressing temperature is in a range of the softening point of glass to (that softening point +50° C.) for low-melting point glass and in a range of the softening point of glass to (that softening point +100° C.) for high-melting point glass.

In view of the elimination of pores from the glass and the working efficiency, a pressing pressure is preferably in a range of 10 to 2000 atm inclusive. It is to be understood that hot isostatic pressing may be effected, for instance, with the magnetic substrate being embedded in a powder having the same composition, for preventing reduction.

The magnetic substrate used in the present invention may be formed of either one of soft Mn-Zn or Ni-Zn ferrite. Particularly good results are obtained, when the present invention is applied to a Mn-Zn ferrite substrate, since at an elevated temperature it reacts easily with oxygen, is chemically unstable, and reacts with the glass components to form an interdiffusion layer in the contact surface thereof with the glass.

The glasses used in the present invention include low-melting point glasses such as high-lead base glasses, not to mention high-melting point glasses such as those based on soda lime, soda barium, borosilicate or the like.

The desired glasses are high-melting point glasses having a softening point of no less than 650° C. on the grounds that they should possess following properties:

1. They should be chemically stable for the subsequent pattern formation, or grinding or polishing;

2. They should be thermally stable and stand to thermal shock, since they receive shocks on the surface at the steps such as sputtering, vapor deposition, photoetching, etc., and are exposed to high temperatures;

3. They should have a coefficient of thermal expansion close to that of the substrate to reduce deterioration in the magnetic properties of the substrate due to the deformation of the substrate or the generation of residual strain;

4. They should possess high thermal resistance, say, stand a temperature of no lower than 500° C. at which low-melting point glass is applied to form a protective film with a view to protecting the pattern on the substrate; and 5. They should possess certain resistance to chipping, cracking, fracture, etc., when processed into a thin film magnetic head.

The present invention will now be explained with reference to the following examples.

EXAMPLES

Three grooves, each measuring 0.15 mm-width×0.03 mm-depth×25 mm-length, were formed by mechanical machining in a 25 mm×25 mm×1 mm Mn-Zn ferrite substrate having a surface precisely finished. High-melting point glass in the foil form having the substantially same size as the groove (trade name: 0080 glass, manufactured by Corning Glass Works, soda lime base glass, coefficient of thermal expansion: $93.5\times10^{-7}/°C$., softening point: 696° C., and working point: 1005° C.) was inserted into each groove. With the application of a load of 0.1 kg/mm$^2$, the glass was heated to a temperature at which it had a glass viscosity of $10^7$ poise, say, to 750° C., in a nitrogen atmosphere, thereby to form a high-melting point glass layer in each groove.

Subsequently, the substrate was subjected to hot isostatic pressing under the conditions at a temperature at which the glass viscosity of said high-melting point glass reached $10^{7.5}$ poise, say 730° C. under a pressure of 100 atm maintaining under the conditions for 1 hour.

In the resultant grooved magnetic substrate according to the present invention, the glass layers did not contain any pores having a size of 1 micron or larger.

For the purpose of comparison, grooves of the same substrate as mentioned above were filled with the foregoing high-melting point glass heated to a temperature at which the glass viscosity reached $10^5$ poise, viz., 880° C. The glass layers were found to contain therein 80 pores having a size of 1 micron or larger.

Figure 2A:
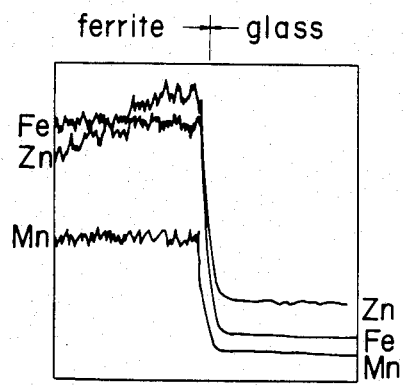
FIGS. 2(a) and 2(b) are diagrams showing the results of the interdiffusion measurement of substrate components and glass components in the groove in the magnetic substrate, which were effected by an X-ray microanalyzer, wherein FIG. a shows the instant invention, and FIG. b illustrates a comparative example (both on the same scale).
Figure 2B:
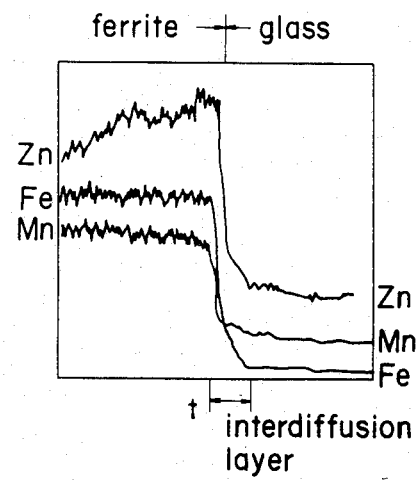

In consequence of the examination of the interdiffusion layers of the glass and substrate components in the grooves in the aforesaid two substrates with the use of an X-ray microanalyzer, the results as shown in FIG. 2 were obtained; the interdiffusion layer t of the components Fe and Zn of the glass and substrate had a thickness of 12 microns for Fe and a thickness of 10 microns for Zn in the Comparative Example shown in FIG. 2b. In the Example according to the present invention, the thickness for both elements was no more than 3 microns, and indicated that the interdiffusion layers were extremely limited and reduced.

What is claimed is:

1. A grooved magnetic substrate for thin film magnetic heads, which has therein at least one groove filled with glass, the number of pores in the filled glass having a size of one micron or larger being no more than one per cubic millimeter, and an interdiffusion layer between said substrate and said glass, said interdiffusion layer having a thickness of no more than 5 microns.

2. A grooved magnetic substrate as defined in claim 1, wherein said groove has an apex point to define the gap depth for the magnetic head.

3. A grooved magnetic substrate as defined in claim 1, wherein the surface of said glass is substantially flush with the surface of the substrate.

4. A grooved magnetic substrate as defined in claim 2, wherein the portion of the substrate surface neighboring said apex point is designed to provide one surface defining the magnetic gap.

5. A grooved magnetic substrate as defined in claim 1, wherein the substrate is Mn-Zn or Ni-Zn ferrite.

6. A process for the production of grooved magnetic substrates, which comprises hot-filling under pressure at least one groove formed in a surface of a magnetic substrate with glass heated to a temperature at which said glass has a viscosity of $10^6$–$10^8$ poise and thereafter subjecting said magnetic substrate to hot isostatic pressing at or below a temperature at which the glass viscosity of said glass is $10^6$ poise wherein the filled glass has no more than one pore of a size of one micron or larger per cubic millimeter.

7. A process as defined in claim 6, wherein the hot isostatic pressing is effected at a temperature between the softening point of the filled glass and a temperature of the softening point plus 100° C.

8. A process as defined in claim 7, wherein the hot isostatic pressing is effected at a temperature between the softening point of the filled glass and a temperature of the softening point plus 50° C.

9. A process as defined in claim 6, wherein the hot isostatic pressing is at a pressure of 10 to 2000 atm.

10. A process as defined in claim 6, wherein the hot isostatic pressing is effected by imbedding the magnetic substrate in a powder.

* * * * *